June 18, 1974   W. L. KEAS   3,817,891
LIQUID FLOCCULENT ADDITIVE FROM POLYACRYLAMIDE
Filed March 22, 1971   2 Sheets-Sheet 1

INVENTOR
WILBER L. KEAS
BY
ATTORNEYS

INVENTOR
WILBER L. KEAS 3,817,891
LIQUID FLOCCULENT ADDITIVE FROM
POLYACRYLAMIDE
Wilber L. Keas, Casper, Wyo.
(308 W. Juniper Lane, Gillette, Wyo. 82716)
Filed Mar. 22, 1971, Ser. No. 126,478
Int. Cl. C08f 29/00
U.S. Cl. 260—29.6 E                    1 Claim

ABSTRACT OF THE DISCLOSURE

A liquid flocculent additive which is readily soluble in cold water is made by mixing ethylene glycol, cationic polyacrylamide and water. The additive mixture is formed by first mixing ethylene glycol and cationic polyacrylamide until substantially every particle of cationic polyacrylamide is thoroughly coated with ethylene glycol. Next water is mixed with the ethylene glycol-cationic polyacrylamide mixture until completely emulsified. Thereafter, the solution is gelled and then sheared, to overcome the gel effect, thereby to produce a highly viscous fluid which is the flocculent additive. The flocculent additive is useful in antipollution projects, such as water purification; with drilling mud and/or drilling water in the removal of cuttings and solids from the shaft of a well being drilled; and in the mining and milling of uranium, copper, zinc, gold or any other processes where the flocculation of undesirable solids in a carrier fluid is necessary or desirable in the process of mineral recovery.

---

The present invention relates to flocculants, and more particularly to an improved type of flocculent additive for use in drilling operations, mining operations, water sanitation projects, antipollution projects and the like. Further, the present invention relates to the method of manufacturing the improved type of flocculent additive.

In drilling projects, such as oil and gas drilling operations, cuttings and other solid matter may be removed from a hole or well being drilled by circulating drilling mud and/or drilling water through the well shaft as the drilling operation is proceeding. Generally, a predetermined portion of the top hole is drilled with clear water while the bottom portion of the hole is drilled with a drilling mud in order to protect pay zones. In the case of using drilling mud, as the mud is circulated through the well shaft a stage in the circulating system operates to settle the cuttings and other solid matter out of the mud before the drilling mud is recycled. Unfortunately, as the drilling process continues, the drilling mud generally increases in density as it is circulated. One major factor contributing to this density increase is incomplete settling of the cuttings due to the fact that a significant portion of the cuttings are so fine as to remain suspended in the mud system when not acted on by flocculants which induce substantially complete settling.

Increase in the density of the drilling mud being circulated is highly undesirable for several reasons. First, an increased load is placed on the pumping mechanism employed to circulate the mud by the increased density of the mud. Secondly, as more and more fine cuttings remain in the mud, the quantity of mud being circulated increases, thereby filling up the hole being drilled and placing an overload on the circulating pump mechanism. Further, the presence of an undue amount of cuttings in the drilling mud causes the mud's conditions and properties to change or deviate from desired standards so that it may be necessary to add water to try to bring the circulating mud back to these desired standards. This added water, in addition to running up the water bill of the drilling operation, also does not always completely mix with the mud so that a condition called hole wetting may be created around the top of the hole being drilled by the water lost at this point.

It is, accordingly, one object of the present invention to provide an improved type of flocculent additive suitable for use with drilling mud and/or drilling water which readily disperses therein, is operable to efficiently aggregate cuttings and solids entrapped therein into flocculent masses or flocs of sufficiently large size to be settled in an efficient mud or water circulating system, is fast acting so as to flocculate cuttings prior to the time the drilling mud or water is settled so that the mud or water is recycled substantially free of cuttings, is compatible with other drilling fluids, and is operable to stabilize or increase drilling mud viscosity and generally enhance mud flow properties.

It is another object of the present invention to provide an improved type of flocculent additive which is premixed in a liquid form ready for use, is substantially 100% cold water soluble, and is suitable for use in various other operations in addition to its use in drilling mud or water in drilling operations, such as in mining processes, water sanitation processes, antipollution projects and the like. Illustration of uses of this improved flocculent additive in these other processes is given below.

As in drilling operations, it is also desirable to use flocculent additives in mining operations. In mining and milling operations, such as in the milling of uranium, copper, zinc, gold and other recovery processes, a carrier fluid is generally used to wash out impurities from the ore being treated and flocculent additives are used for the purpose of flocculating the impurities in the carrier fluids, thereby to reduce the amount of carrier fluid needed to wash out the ore. For example, in the extraction of uranium, it is essential that the uranium extracted be extremely pure and of high radioactivity. Very often the desired radioactive product to be extracted possesses only a small portion of the total activity of the ore being treated. To obtain the extreme degree of purification necessary, repeated removal of the impurities from the uranium ore with fresh or clean carrier fluids are necessary; this is the so called "washing out" principle. The carrier fluid used is generally a diluted HCl solution and the improved flocculent additive herein described may be used for flocculating the impurities collected in the carrier fluids, thereby to reduce the total amount of carrier fluid needed and reduce the time necessary to wash out the uranium ore.

Other types of separation processes are used in mineral extraction, such as precipitation, ion exchange, volatilization, solvent extraction, leaching, and electro-chemical methods. These methods are suitable for use in extracting specific minerals from both radioactive and nonradioctive ores. In a precipitation process, a solution, such as a water based solution, is used to treat the ore. The mineral to be recovered is removed by precipitation from this solution and the flocculent additive herein described may be used once the mineral has been recovered to flocculate the impurities out of the solution so as to permit immediate reuse of the solution with another charge of ore. The ion exchange technique of mineral extraction involves the adsorption of a mixture of ions of an ion exchange resin followed by selective elution from the resin, i.e., removal of the mineral adsorbed from the adsorbent by means of a solvent. The improved flocculent additive may be employed to remove impurities from the carrier fluid or solvent used in the elution step, thereby to permit reuse of the fluid. Also, the improved additive could be used in the selective elution process of the resins if the fluid used were distilled water. Thereby, the extraction process could be speeded up in that the pure matter to be recovered would flocculate to the bottom and the water could be drained off the top. Likewise, the improved flocculent additive could be used in volatilization, solvent extraction and electro-chemical mineral extraction techniques to flocculate impurities out of solutions employed in these techniques, thereby to reduce costs in these processes.

As before-metioned, the improved additive is also useful in sanitation and antipollution projects. For example, with the disposal of animal waste there is a shortage of water available in the West. After delivering a load of cattle, cattle trucks request service stations to wash out their trailers. This is generally accomplished by driving the trailer over a pit and then washing the trailer out with water to remove the animal waste. Unless recovered, this water constitutes a considerable loss. The improved flocculent additive may be employed to flocculate the animal waste out of the water collected in the pit thereby to make the water reusable again simply by the addition of chlorine. The pits, further, could be emptied regularly of the animal waste by septic trucks and the waste could be used as fertilizer. Thus, by use of the improved flocculent additive excessive amounts of polluted water are converted into a reusable water supply and fertilizer.

In the disposal of human waste, the improved flocculent additive may be added to a city's sewage at the point it enters the sanitation plant. Thereby, the time required for the settling of human waste could be substantially reduced and by the addition of chlorine, water heretofore lost could be made available for use as drinking water. Also in the prevention of pollution, the improved additive could be added to waste water leaving refineries, mines, plants, etc. to clean the water being now dumped into our rivers, streams, lakes and reservoirs. Since the water dumped would be clean, these plants also could reuse the same water over again in their operations.

In addition to providing an improved versatile, fast acting and powerful type of flocculent additive, it is an object of the present invention to provide a novel method for manufacturing the flocculent additive.

In accomplishing these and other objects, there has been provided in accordance with the present invention a liquid flocculent additive made by mixing predetermined quantities of ethylene glycol, cationic polyacrylamide and water. Apparatus is provided for forming the additive mixture by the steps of mixing ethylene glycol with cationic polyacrylamide until substantially every particle of cationic polyacrylamide is thoroughly coated with ethylene glycol, adding water and emulsifying the solution, gelling the emulsified solution, and then shearing the solution to overcome the gel effect and produce a highly viscous fluid which is the flocculent additive. The improved flocculent additive is, as before-mentioned, suitable for use in various operations, such as drilling operations, mining operations, sanitation processes, anti-pollution processes and the like.

A better understanding of the present invention may be had from the following detailed description when read in conjunction with the accompanying drawings, in which.

Figure 1:
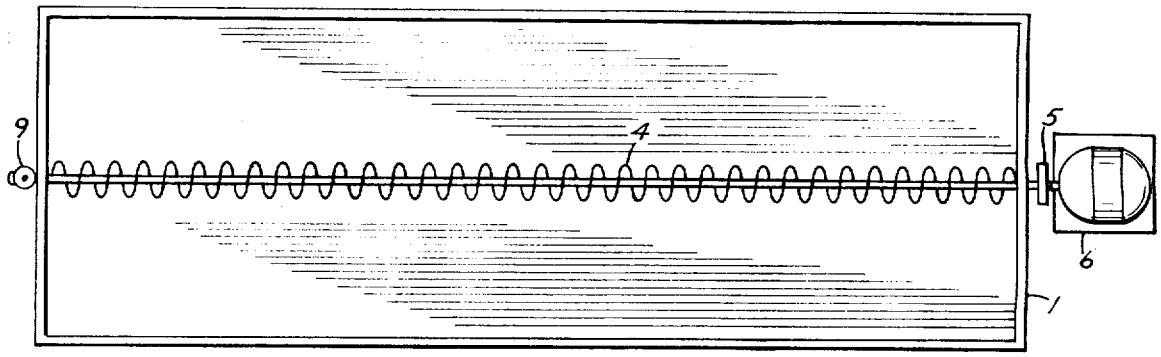
FIG. 1 is a top plan view of one mixing tank assembly suitable for use in manufacturing a flocculent additive according to the present invention.
Figure 2:
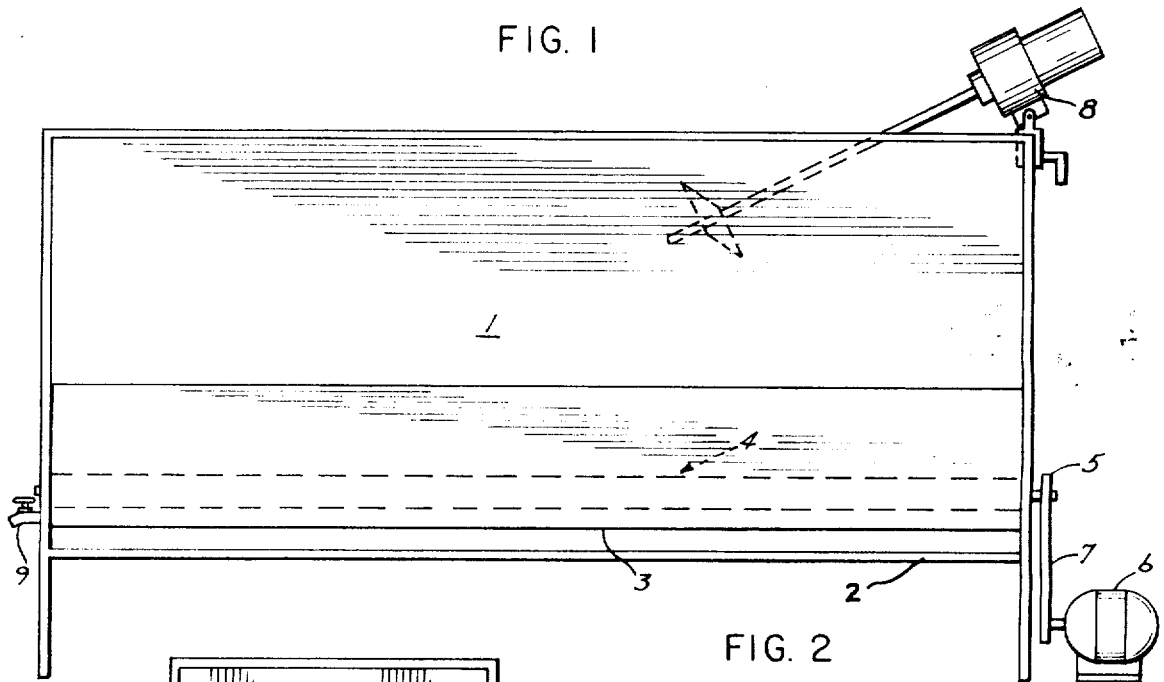
FIG. 2 is a side elevation view of the tank assembly of FIG. 1 with a mixer unit mounted thereon.
Figure 3:
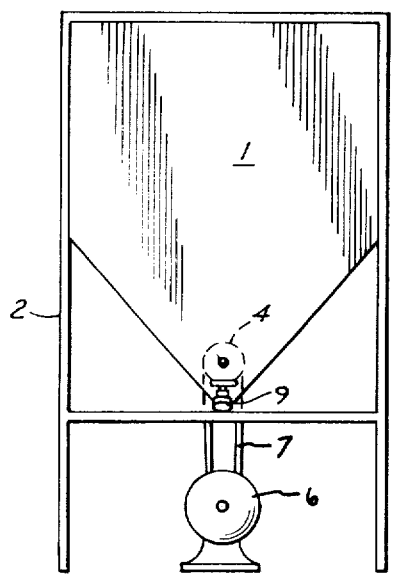
FIG. 3 is a front elevation view of the tank assembly of FIG. 1.

Referring to the drawings in more detail, there is shown in FIGS. 1–3 apparatus for mixing a flocculent additive in accordance with the present invention. The apparatus is made up of an upward opening mixing tank 1 which is supported above floor level by support structure 2. The longitudinal extending sides of the tank 1 extend from the top of the tank first vertically downward then angle towards each other to form a central, longitudinal running ridge portion 3 along the bottom of the tank 1. Mounted within the tank 1 to extend lengthwise therein preferably adjacent to the ridge 3 is an auger arrangement 4. The shaft of the auger 4 extends in a fluid seal arrangement through one end of the tank 1 and has a pulley 5 mounted thereon. A motor 6, preferably electric, is connected by means of a belt drive 7 to the pulley 5 to selectively drive the auger 4. The motor 6 is preferably a 3 HP., 800 r.p.m. electric motor. Mounted on the upper edge of the tank 1, such as by being clamped thereon, is a mixer unit 8, preferably of relatively high speed such as 1740 r.p.m. Additionally, a valve operated discharge outlet or hose 9 is provided in the lower portion of the tank 1 adjacent the ridge 3 at the end of the tank 1 remote from the pulley 5.

In order to manufacture a batch of the exemplary flocculent additive in the apparatus of FIGS. 1–3, 125 gallons of ethylene glycol, a liquid, and 55 pounds of cationic polyacrylamide, a powder, is added to the tank 1. The auger 4 is then driven by the motor 6 preferably at 800 r.p.m. for approximately 15 minutes. Thereby, the cationic polyacrylamide is mixed thoroughly with the ethylene glycol so that each particle of cationic polyacrylamide becomes thoroughly coated with the ethylene glycol. It is noted that the size of the mixing tank 1 is preferably 500 gallons and the auger 4 used has preferably a 5 inch diameter blade.

After the ethylene glycol and cationic polyacrylamide have been mixed as before-described, the high speed mixer 8 is operated at preferably a speed of 1725 r.p.m. in combination with the operation of the auger 4 at 800 r.p.m. It is noted that the mixer 8 preferably has a 5¼ inch diameter blade. With the mixer 8 and the auger 4 operating, 125 gallons of water are slowly added to the ethylene glycol-cationic polyacrylamide solution. The purpose of the high speed mixer 8 is to emulsify the water in this solution and once this result is obtained the mixer 8 is shut down. The auger 4, however, is continued in operation for approximately 4 more hours at 800 r.p.m. until the cationic polyacrylamide is completely in solution and the resulting mixture gels. Once the ethylene glycol-cationic polyacrylamide-water mixture has gelled, the mixer 8 is again operated at preferably 1725 r.p.m. in combination with the auger at preferably 800 r.p.m. to shear, cut or beat the mixture until the gel effect is overcome. During this process, the mixture first becomes highly aerated and then becomes a highly viscous, substantially homogeneous liquid concentrate which is substantially 100% cold water soluble. It is noted that water is mixed in the additive concentrate since if water were not mixed therein the consistency of the concentrate would be gummy, not readily pourable and perhaps not homogeneous. The manufactured flocculent additive concentrate is then ready for packaging in cans or containers, such as five gallon semi-flexible plastic containers, by selectively operating the valve in the discharge outlet 9 to fill each container. The quantities of ingredients above-mentioned, i.e., 125 gallons of ethylene glycol, 55 pounds of cationic polyacrylamide, and 125 gallons of water, produce approximately 250 gallons of the dark red, viscous flocculent additive.

In the table below is listed a breakdown of the composition of ingredients in a preferred composition of the additive which has been found effective. The quantities which are given are for a bulk plant site mixing.

polyacrylamide and water form a homogeneous mixture. Then this mixture is gelled and thereafter the shaft 22

| Product | Physical state | Volume mixed, gals. | Weight mixed, lbs. | Percent by weight | Mixture by parts | Parts per million |
|---------|----------------|---------------------|--------------------|--------------------|------------------|-------------------|
| Ethylene glycol | Liquid | 125 | 1,150 | 51.3 | 20.9 | 513,000 |
| Cationic polyacrylamide | Powder | | 55 | 2.4 | 1 | 24,000 |
| Water | Liquid | 125 | 1,037.5 | 46.3 | 18.9 | 463,000 |

Figure 4:
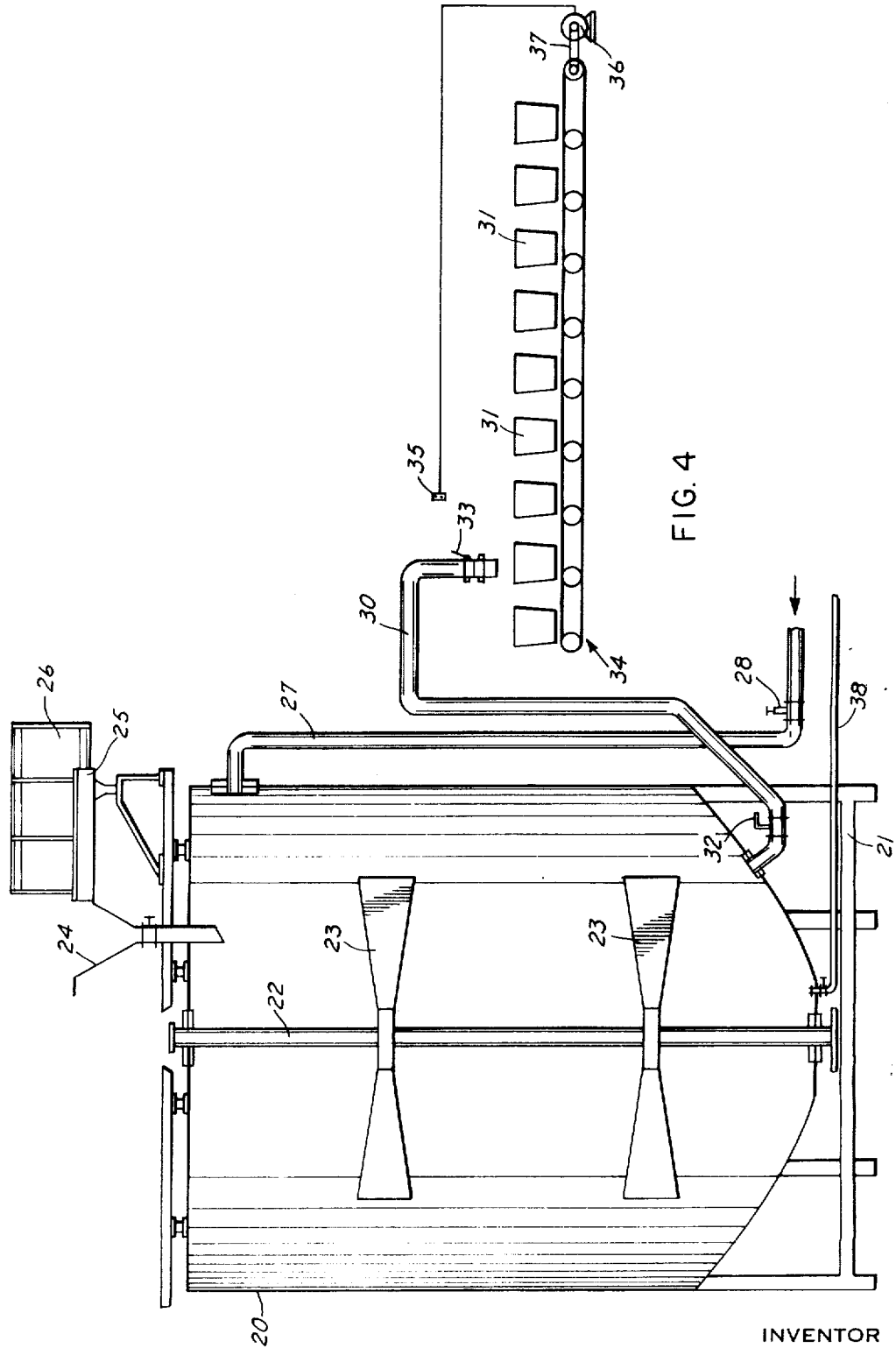
FIG. 4 is a sectional elevation view of an alternate embodiment of mixing tank assembly with assembly line for use in manufacturing and packaging a flocculent additive according to the present invention.

Referring now to FIG. 4, there is shown an alternate embodiment of mixing assembly for preparing the flocculent additive of the present invention. The mixing assembly shown in FIG. 4 includes a mixing tank 20 supported by support structure 21. Mounted centrally for rotation in the tank 20 is a vertically disposed shaft 22 having a pair of horizontally disposed large mixing blades 23. Means not shown are provided for driving the shaft 22 at any of several selected speeds of rotation, such as 400 or 1200 r.p.m. The tank 20 has a hopper 24 supported thereover through which ingredients, such as ethylene glycol and cationic polyacrylamide, may be added to the mixing tank 20. Structure 25 is constructed on the tank 20 adjacent the hopper 24 for holding a barrel, such as the barrel of ingredients 26 shown, so that the ingredients may be poured into the tank 20 through the hopper 24. To supply water to the tank 20, a water line 27 is connected to the tank's upper portion. The flow of water through the line 27 is controlled by a gate valve 28.

A production line 30 is connected to the lower portion of the tank 20 for supplying the finished additive to containers 31 in which the flocculent additive is to be packaged. Flow of the additive in the production line 30 is controlled by valves 32 and 33, and a conveyor type assembly line 34 operates to move the containers 31 below the discharge point of the line 30. Thereby, an operator by selectively pulling open the valve 33 may fill each container 31 with the flocculent additive. The movement of the containers 31 along the assembly line 34 may be also controlled by the operator by selectively actuating the on-off switch 35 which controls the operation of the conveyor motor 36. The motor 36 drives the conveyor 34 by means of a belt 37. Additionally, a valve operated drain line 38 is connected to the bottom of the tank 20 for draining residue therefrom.

In use of the apparatus of FIG. 4 in manufacturing the flocculent additive of the present invention, suitable quantities of ethylene glycol and cationic polyacrylamide are first added to the tank 20 through the hopper 24 and mixed with the mixer blades 23 rotating preferably at a rate of 400 r.p.m. As before-mentioned, the cationic polyacrylamide is mixed thoroughly with the ethylene glycol so that each particle of cationic polyacrylamide becomes thoroughly coated with ethylene glycol. A suitable quantity of water is next added by opening the valve 28 in water line 27 and the shaft 22 is again driven at approximately 400 r.p.m. until the ethylene glycol, cationic is driven at a much higher rate, such as 1200 r.p.m., to shear the gelled mixture, thereby to produce the flocculent additive. The valve 32 is next opened in the production line 30, the assembly line 34 is operated and the valve 33 is selectively opened to fill each container 31 as it is moved past the discharge end of the production line 30.

Thus, there has been provided an improved type of flocculent additive which is characterized by being in a liquid concentrate pre-mixed form, fast acting, powerful, and suitable for use in various operations, such as drilling operations, mining operations, sanitation processes, antipollution processes and the like. Additionally, a novel method is provided for making the flocculent additive.

I claim:
1. The process of manufacturing a liquid flocculent additive concentrate including the steps of:
  (a) first, mixing, in proportion by weight, approximately 21 parts of liquid ethylene glycol with one part of powdered cationic polyacrylamide until each particle of the polyacrylamide is thoroughly coated with the ethylene glycol;
  (b) thereafter mixing approximately 19 parts of water, based upon the one part of polyacrylamide, to effectively disperse the water and the ethylene glycol into each other as a homogenous mixture;
  (c) stirring the homogenous mixture until a gel is formed; and
  (d) shearing the gelled mixture to a viscous liquid by agitation.

References Cited
UNITED STATES PATENTS

| | | | |
|---|---|---|---|
| 2,780,610 | 2/1957 | Barber et al. | 260—33.4 |
| 3,163,619 | 12/1964 | Sheats et al. | 260—29.6 |
| 3,350,338 | 10/1967 | Savage | 260—29.6 |
| 3,412,060 | 11/1968 | Sarem | 260—29.6 |
| 3,493,529 | 2/1970 | Krottinger et al. | 260—29.6 |

FOREIGN PATENTS 155,163  10/1968  Hungary.

OTHER REFERENCES

Davidson and Sittig: "Water Soluble Resins, 2nd Ed.," Reinhold, New York, 1962, pp. 176–77.

MELVIN GOLDSTEIN, Primary Examiner